(12) United States Patent
Sakakibara et al.

(10) Patent No.: US 11,617,962 B2
(45) Date of Patent: Apr. 4, 2023

(54) SYSTEM FOR CREATING PLAY-RECORDING VIDEO

(71) Applicants: Masahiro Sakakibara, Kyoto (JP);
Masashi Komoshita, Kyoto (JP);
REDEFINEARTS INC., Kyoto (JP)

(72) Inventors: Masahiro Sakakibara, Kyoto (JP);
Masashi Komoshita, Kyoto (JP)

(73) Assignees: Masahiro Sakakibara, Kyoto (JP);
Masashi Komoshita, Kyoto (JP);
REDEFINEARTS CO., LTD, Kyoto (JP)

( * ) Notice: Subject to any disclaimer, the term of this patent is extended or adjusted under 35 U.S.C. 154(b) by 0 days.

(21) Appl. No.: 17/547,038

(22) Filed: Dec. 9, 2021

(65) Prior Publication Data

US 2022/0184509 A1    Jun. 16, 2022

(30) Foreign Application Priority Data

Dec. 11, 2020  (JP) .............................. JP2020-205782
Jan. 28, 2021  (JP) .............................. JP2021-012257

(51) Int. Cl.
*A63F 13/86*    (2014.01)
*A63F 13/525*    (2014.01)
*A63F 13/537*    (2014.01)

(52) U.S. Cl.
CPC ............ *A63F 13/86* (2014.09); *A63F 13/525* (2014.09); *A63F 13/537* (2014.09)

(58) Field of Classification Search
CPC ....... A63F 13/537; A63F 13/86; A63F 13/525
See application file for complete search history.

(56) References Cited

U.S. PATENT DOCUMENTS 11,096,261 B1 *  8/2021  Monaghan ............. H05B 47/11
2011/0281645 A1  11/2011  Wolfson et al.
(Continued)

FOREIGN PATENT DOCUMENTS

| EP | 2 907 557 A1 | 8/2015 |
| JP | 2006-006853 A | 1/2006 |
| WO | 2015/200737 A1 | 12/2015 |

OTHER PUBLICATIONS

"TRPG Sutajio (TRPG Studio)" STRIKEWORKS, Retrieved Nov. 5, 2020, [https://trpg-studio.com].
(Continued)

*Primary Examiner* — Reginald A Renwick
(74) *Attorney, Agent, or Firm* — Oliff PLC (57) ABSTRACT

For real-time creation of a play-recording video that is not boring, the system includes: a first terminal having a first display section; second terminals each having a second display section; a storage section holding display data of a virtual space and avatars of characters; an avatar display controller which displays avatars within the virtual space according to input operations on the second terminals; a shooting position setter which sets, as a shooting position, a long-shot position or an avatar-capturing position for capturing a character's avatar according to an input operation on the first terminal; a virtual space imager which creates an image taken with a virtual camera at the shooting position; first and second screen display controllers which display the image on the first and second display sections; and a play-recording-video creator which sequentially records a play screen and creates a video.

8 Claims, 5 Drawing Sheets

(56) References Cited

U.S. PATENT DOCUMENTS

2012/0021840 A1    1/2012   Johnson et al.
2017/0282071 A1   10/2017   Kurabayashi
2018/0161682 A1    6/2018   Myhill

OTHER PUBLICATIONS

May 11, 2022 Extended Search Report issued in European Patent Application No. 21213655.0.

\* cited by examiner

SYSTEM FOR CREATING PLAY-RECORDING VIDEO

TECHNICAL FIELD

The present invention relates to a system for creating a recording video of a theatrical role play, such as a table-top role-playing game (TRPG), as well as a play-recording video of a manipulation-type game, such as a sports game or fighting game.

BACKGROUND ART

Table-top role-playing games (TRPGs) have been known as a type of game in which a plurality of players enjoy role playing according to a scenario prepared by a game master. TRPGs were originally developed in the form of board games. However, in recent years, it has been increasingly common for TRPGs to be implemented as an online game in which terminals to be individually operated by players and a game master are connected through a communication network (for example, see Non Patent Literature 1).

A brief description of the flow of a TRPG is as follows: A game master (who may also be called a "game keeper") prepares a scenario of the TRPG. The scenario is set so that a plurality of characters will appear. Multiple players determine which characters they will play in the scenario, respectively. In many cases, a TRPG scenario consists of a plurality of scenes, and a story which forms the basis of the role play is set for each scene. Unlike the scenarios of commonly known RPGs offered as computer games in which the game should develop in a previously determined way, TRPG scenarios allow the game master and players to decide how each scene should develop as far as their decisions do not destroy the entire story.

When the game is started, the background image of the first scene, with the avatars of the characters chosen by the players, is displayed on the display unit of each of the terminals operated by the game master and the players. The game master initially outlines the scenario and proceeds with the scenes according to the scenario. In each scene, the game master prompts the players to make their respective characters act as specified in the scenario. For example, the action of a character may be the selection of one of the options prepared in each scene, or a conversation or fight with non-player characters (NPCs) which are prepared in the scenario as players other than the aforementioned players. The action may be accompanied by the judgment on whether or not the action is a success. For this judgment, the spots on the dice are used, for example. Each player can manipulate his/her character apart from the progression of the scenario so as to have a conversation with the character of another player or change the facial expression or body motion of the avatar of his/her character displayed on the screen. After one scene has come to a predetermined end, the game master changes the background image to the next one and proceeds to the next scene. The entire game will be over when all scenes have been played.

As just described, TRPGs have a degree of freedom in how a scenario develops. Since the success or failure of a character's action depends on the spots on the dice, the same scenario can produce different progressions or results for each play of the scenario. Therefore, TRPG players often use video sites to have social interactions with other players. For example, a player may upload a play video which records the game screen of a TRPG he/she played with other players, to introduce the video to others, or conversely, a player may view a play video of a TRPG which someone else played.

There are similar social interactions in the area of manipulation-type games, such as sports games (e.g., baseball, tennis or golf) or fighting games. For example, skilled players may record and upload play videos to introduce them to other players, in order to show off their levels of skill (or for other purposes), while other players may view play videos of a game which someone else played, in order to improve their levels of skill by watching the games played by other players (or for other purposes).

CITATION LIST

Non Patent Literature

Non Patent Literature 1: "TRPG Sutajio (TRPG Studio)", [online], STRIKEWORKS, [accessed on Nov. 5, 2020], the Internet

SUMMARY OF INVENTION

Technical Problem

Conventional play screens of a TRPG show nothing more than a background image of each scene with the avatars of characters combined with it. A video created from those play screens is monotonous, with few noticeable visual changes except for the facial expression and body motion of the avatars. The same also applies in the case of manipulation-type games. The play screen of a manipulation-type game is originally designed for the manipulation of a character by a player. Recording such a type of play screen will result in a monotonous play video, with few noticeable visual changes except for the body motion of the character. A play video may be longer than one hour, in which case the viewer will be bored while watching the monotonous video with few noticeable visual changes.

Some TRPG play videos published online are prepared in the form of an original animation video in which the background images, avatars and other elements of a TRPG which has been played are combined so that the video will not bore the viewers. However, newly creating an animation video after playing a TRPG requires an additional amount of time. Furthermore, creating an animation video is technically challenging, and only a person skilled in this type of technique can create the aforementioned type of video.

The problems of the conventional techniques have been described so far referring to the example of a play video of a TRPG or that of a manipulation-type game. Similar problems also occur with other various types of play videos.

The problem to be solved by the present invention is to provide a technique by which a play-recording video that will not bore the viewers can be created in real time.

Solution to Problem

The present invention developed for solving the previously described problems is a system for creating a play-recording video which records a play performed by one or more players using their respective characters, the system including:

a first terminal including a first display section;

one or more second terminals each of which includes a second display section and is connectable to the first terminal via a communication network;

a storage section in which display data of a virtual space in which the play is performed, and display data of avatars of the characters, are stored;

an avatar display controller configured to respond to a predetermined input operation on one of the second terminals and read, from the storage section, the display data of the avatar of the character of the player corresponding to the terminal concerned, as well as display the avatar in the virtual space;

a shooting position setter configured to respond to a predetermined input operation on the first terminal and set, as a shooting position, a long-shot position for obtaining a long-shot view of the entire virtual space or an avatar-capturing position for capturing, with a previously determined angle of view, one of the avatars of the one or more characters arranged within the virtual space;

a virtual space imager configured to create an image of the virtual space taken with a virtual camera at the shooting position;

a first screen display controller configured to display an image obtained by the virtual space imager, as a shooting screen on the first display section;

a second screen display controller configured to display, on the second display section, the shooting screen or a previously determined play screen for manipulating the characters; and a play-recording-video creator configured to create a play-recording video by sequentially recording the shooting screen.

The first terminal is a terminal to be used by an individual who creates a video of a theatrical role play, such as a table-top role-playing game (TRPG), or a play-recording video of a manipulation-type game, such as a sports gamer (for example, this individual may be a game master who is going to create a play-recording video of a theatrical role play, or a creator of a play-recording video who is going to create a play-recording video of a manipulation-type game). The second terminal is a terminal to be used by a player who enjoys role playing in a theatrical role play or one who manipulates a character in a manipulation-type game.

In the previously described system, the storage section, avatar display controller, shooting position setter, virtual space imager, first screen display controller, second screen display controller and play-recording-video creator may be provided on a server machine configured to be capable of communicating with the first terminal and the one or more second terminals via a communication network. In that case, the system according to the present invention takes the form of a system including the server machine, the first terminal and a plurality of second terminals. As another possibility, the previously listed components may be partially or entirely provided on the first terminal. If those components are entirely provided on the first terminal, the system according to the present invention can be constructed from only the first terminal and a plurality of second terminals.

Conventional TRPG play screens show two-dimensional virtual spaces. The virtual space in the present invention may be a representation of a two-dimensional space similar to the conventional one, or it may be a representation of a three-dimensional virtual space.

According to the present invention, for example, when a TRPG is played, a game master controls the progression of the scenario through the first terminal. Each player performs predetermined input operations on his/her second terminal so that the avatar of the character which he/she is playing ("player character") acts in the virtual space. The game master can switch the shooting position of the virtual space by performing a predetermined input operation on the first terminal. By performing this operation according to the situation of the role play, the game master can switch the play screen displayed on the first display section of the first terminal and the second display section of each second terminal between an image of the virtual space with the ongoing role play taken from a long-shot position for obtaining a long-shot view of the entire virtual space and an image in which one of the avatars of the one or more characters within the virtual space is captured with a previously determined angle of view. This play screen is sequentially recorded by the play-recording-video creator and compiled into a play-recording video. The characters mentioned earlier may include non-player characters which are made to act by the game master performing a predetermined input operation on the first terminal. That is to say, the avatar-capturing position mentioned earlier includes not only a position for capturing a player character but also a position for capturing a non-player character.

According to the present invention, for example, the game master can control the displayed image in such a manner that an image which captures only the avatar of a character is displayed when that character is playing an important role for the progression of the scenario and deserves the spotlight, while a long-shot image showing the entire virtual space is displayed in other situations. The play-recording video recorded in this manner will be varied in the display mode, and therefore, will not bore the viewers. Furthermore, this play-recording video can be created in real time while the role play is ongoing.

When a manipulation-type game (e.g., a baseball game) is played according to the present invention, a player using his/her second terminal proceeds with the game by manipulating an avatar of a character, based on a scenario previously set in the game software, while watching the play screen with an angle of view previously set in the game software. In the case of a competition game by a plurality of players, a play screen for a player to manipulate the avatar of his/her character is displayed on the second display section of the second terminal of that player. This means that each player has a different display screen displayed on the second display section. The aforementioned play screen may additionally be used as one of the images of the virtual space taken with virtual cameras from avatar-capturing positions each of which is arranged so as to capture, with a previously determined angle of view, one of the avatars of the one or more characters arranged within the virtual space. This decreases the number of virtual cameras to be added for taking images for the shooting screen, whereby the system load can be lowered.

An individual ("video creator") who is going to create a recording video of a play performed by players watches the situation of the play performed by the players through the first terminal and changes the shooting position of the virtual space by performing a predetermined input operation on the first terminal. By this operation, the video creator selects, as the shooting screen, either an image of the virtual space with the ongoing play taken from the long-shot position for obtaining a long-shot view of the entire virtual space or an image in which one of the avatars of the one or more characters is captured with a previously determined angle of view. The selected shooting screen is displayed on the first display section of the first terminal. The video is created based on this shooting screen. As with the previously described example, the aforementioned characters may include non-player characters, such as the other competitors, or spectators. That is to say, the avatar-capturing position mentioned earlier includes not only a position for capturing a player character but also a position for capturing a non-player character.

In the system according to the present invention, it is preferable that the first display section should include:

a shooting screen display area for displaying the shooting screen;

a long-shot-image display area for displaying a long-shot image showing the entire virtual space; and an avatar-image display area for displaying an image in which the avatars of the one or more characters are individually captured.

In the system configured in the previously described manner, when any of the one or more characters has made a distinguishing action, the game master can easily recognize the action of the character in the avatar-image display area and set a shooting position for capturing the avatar of that character.

In the system according to the present invention, it is preferable that the second display section should include:

a first display area for displaying the shooting screen or the play screen; and a character position information area for displaying an image showing the position within the virtual space of the avatar of the character of the player operating the second terminal concerned.

When the game master sets a position for capturing the avatar of the character of one player as the shooting position, only that avatar is shown on the shooting screen, and it is difficult for the other players to recognize where the avatar of his/her character is located within the virtual space. The previously described configuration allows each player to conveniently recognize where the avatar of his/her character is located within the virtual space even when the avatar of his/her character is not shown on the shooting screen.

ADVANTAGEOUS EFFECTS OF INVENTION

By using the present invention, one can create, in real time, a play-recording video that will not bore the viewers.

DESCRIPTION OF EMBODIMENTS

A system for creating a theatrical-role-play-recording video as one embodiment of the system for creating a play-recording video according to the present invention is hereinafter described with reference to the drawings. The system for creating a theatrical-role-play-recording video according to the present embodiment is used for creating a play-recording video of a TRPG.

Figure 1:
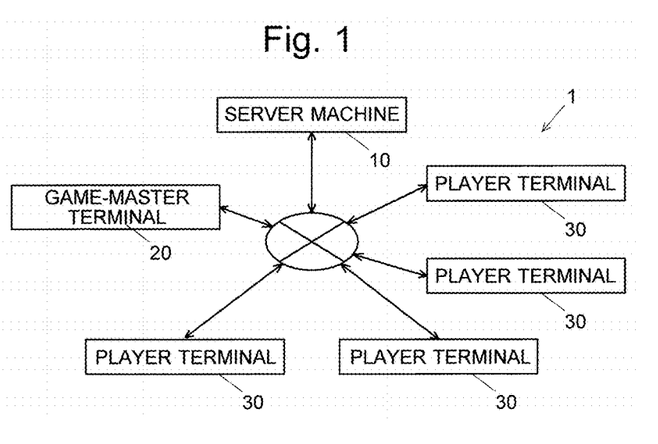
FIG. 1 is an example of the overall configuration of a system for creating a play-recording video according to the present invention.

As shown in FIG. 1, the system for creating a theatrical-role-play-recording video 1 according to the present embodiment (which may hereinafter be simply called the "system 1") roughly consists of a server machine 10, a game-master terminal 20 (which corresponds to the first terminal in the present invention) and a plurality of player terminals 30 (which correspond to the second terminals in the present invention). The game-master terminal 20 and player terminals 30 can connect to the server machine 10 via a communication network.

Figure 2:
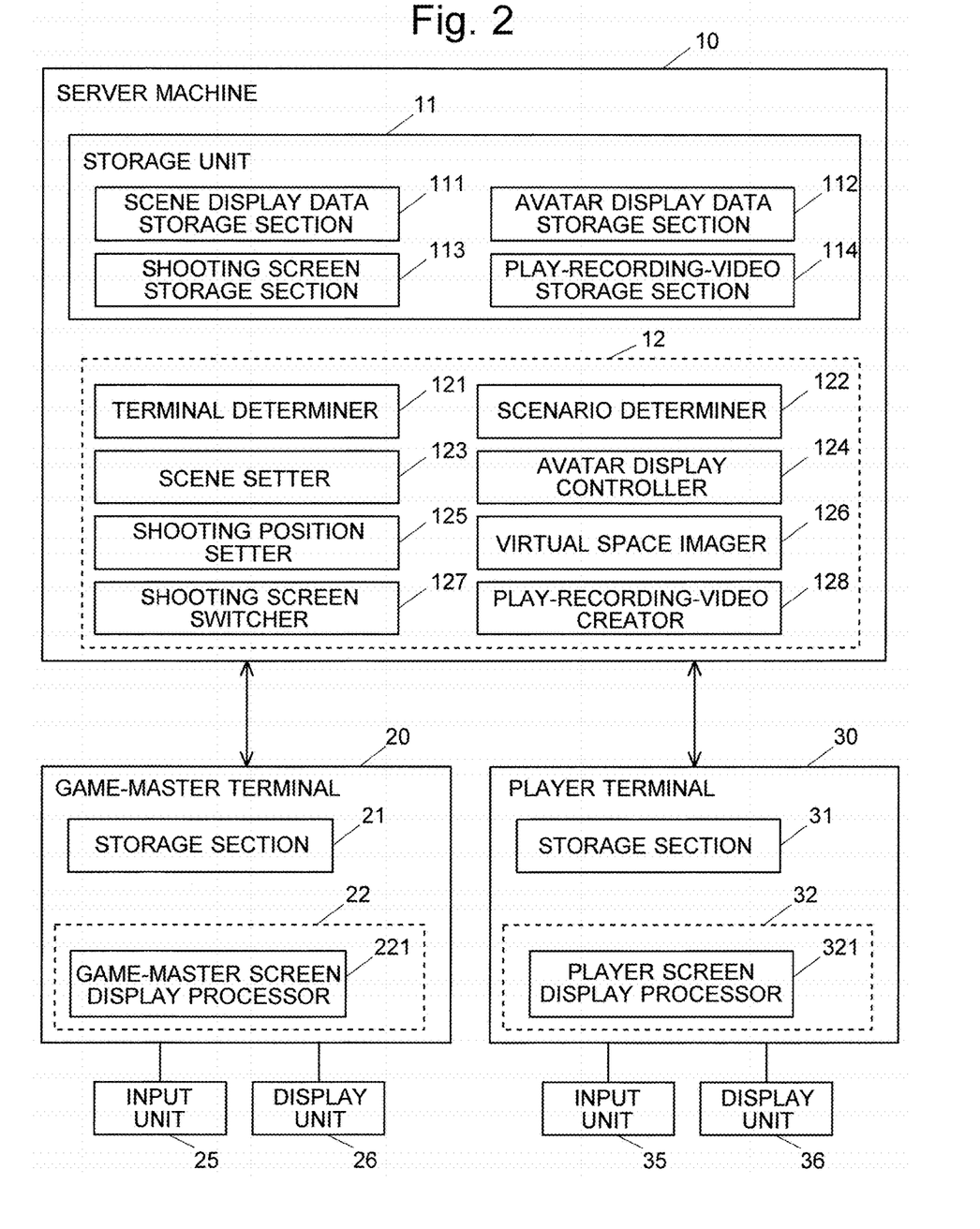
FIG. 2 is a diagram illustrating the configuration of the server machine, game-master terminal and player terminal in a system for creating a theatrical-role-play-recording video according to the present embodiment.

FIG. 2 shows the configurations of the server machine 10, game-master terminal 20 and player terminal 30.

The server machine 10 is operated and managed, for example, by a company which offers the software used in the system 1 of the present embodiment, or a company which offers scenarios, characters and other materials for TRPGs.

The server machine 10 includes a storage unit 11, in which the following sections are provided: a scene display data storage section 111 in which the display data of the scenes included in a scenario are stored for each of the scenarios; an avatar display data storage section 112 in which the display data of the avatars of the characters to be used in a scenario are stored for each of the scenarios; a shooting screen storage section 113 in which shooting screens are to be saved; and a play-recording-video storage section 114 in which play-recording videos are to be saved.

The server machine 10 has a terminal determiner 121, scenario determiner 122, scene setter 123, avatar display controller 124, shooting position setter 125, virtual space imager 126, shooting screen switcher 127, and play-recording-video creator 128 as its functional blocks. These functional blocks are embodied by a processor executing a server machine program 12 previously installed on the server machine 10. As will be detailed later, a shooting screen is displayed on both the display unit 26 of the game-master terminal 20 and the display unit 36 of each player terminal 30 in the present embodiment. Therefore, the shooting screen switcher 127 functions as both the first screen display controller and the second screen display controller in the present invention.

The game-master terminal 20 and the player terminals 30 are terminals to be used by individuals who are going to play a TRPG. The game-master terminal 20 includes a storage section 21 and a game-master screen display processor 221 as a functional block. The game-master terminal 20 is actually a common type of computer, on which the game-master screen display processor 221 is embodied by a processor executing a game-master terminal program 22 previously installed on the computer. An input unit 25 for a game master to make appropriate inputs and instructions, and a display unit 26 (which corresponds to the first display section in the present invention) for displaying various screens as will be described later, are connected to the game-master terminal 20.

The player terminal 30 includes a storage section 31 and a player screen display processor 321 as a functional block. Similar to the game-master terminal 20, the player terminal 30 is actually a common type of computer, on which the player screen display processor 321 is embodied by a processor executing a player terminal program 32 previously installed on the computer. An input unit 35 for a player to make appropriate inputs and instructions, and a display unit 36 (which corresponds to the second display section in the present invention) for displaying various screens as will be described later, are also connected to the player terminal 30.

The game-master terminal 20 and the player terminals 30 are not limited to personal computers; they may be similar devices which can connect to the server machine 10 via a communication network as well as have (or allow for the connection of) an input unit and a display unit. For example, they may be portable terminals, such as smartphones or tablets.

In FIG. 2, for convenience of explanation, the game-master terminal 20 and the player terminal 30 are shown as separate terminals. Actually, any of these terminals is configured so that the same individual can act as a game master or player when playing a TRPG. More specifically, a set of TRPG programs including both the game-master terminal program 22 and the player terminal program 32 are previously installed on each computer. The game-master terminal program 22 is executed for a user who plays a TRPG as the game master, while the player terminal program 32 is executed for a user who plays a TRPG as a player.

A description of the flow of the TRPG played in the system according to the present embodiment is as follows.

The game master initially logs in the server machine 10 from the terminal he/she is using, and performs a predetermined input operation to declare that he/she will play a TRPG as a game master (e.g., by pressing a "Game Master" button, which is displayed with a "Player" button on the screen). Upon receiving this operation, the terminal determiner 121 in the server machine 10 designates the terminal concerned as the game-master terminal 20. The game-master terminal program 22 is executed on the game-master terminal 20, and the game-master screen display processor 221 mentioned earlier begins operating.

After the game-master terminal 20 has been designated, the scenario determiner 122 shows a list of prepared TRPG scenarios on the display unit 26. The game master performs an input operation for selecting one of the scenarios from the list shown on the display unit 26 of the game-master terminal 20. The scenario determiner 122 in the server machine 10 determines that the selected scenario should be used as the scenario for the TRPG. It also begins to accept applications for the participation in the TRPG using that scenario as players.

A player logs in the server machine 10 from the terminal he/she is using, and performs a predetermined input operation to declare that he/she will play the TRPG as a player (e.g., by pressing the "Player" button, which is displayed with the "Game Master" button on the screen). Upon receiving this operation, the terminal determiner 121 in the server machine 10 registers the terminal concerned as a player terminal 30. The player terminal program 32 is executed on the player terminal 30, and the player screen display processor 321 mentioned earlier begins operating.

After a player terminal 30 has been registered, the scenario determiner 122 sends the player terminal 30 a list of scenarios which are open for the participation of new players. On the player terminal 30, the received list of scenarios is displayed on the display unit 36. The player performs an input operation for selecting one of the scenarios from the list displayed on the display unit 36 of the player terminal 30. In the server machine 10, the scenario determiner 122 registers the selected scenario as the scenario for the TRPG to be played on the player terminal 30 concerned.

After the number of players who have decided to join the game has reached the previously determined number for the scenario selected in the game-master terminal 20, each player selects a character to be manipulated through his/her player terminal 30. The information of the character selected on each player terminal 30 is sent to the server machine 10, and the scenario determiner 122 links each player terminal 30 with the corresponding character.

Figure 3:
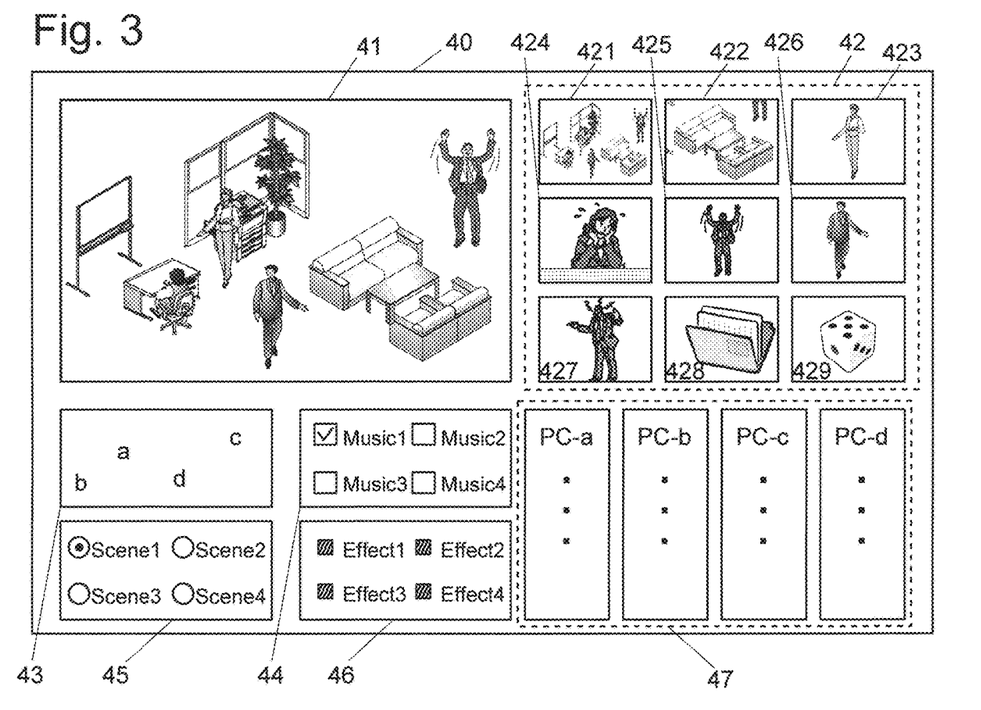
FIG. 3 is an example of the screen to be displayed on the display unit of the game-master terminal in the present embodiment.
Figure 4:
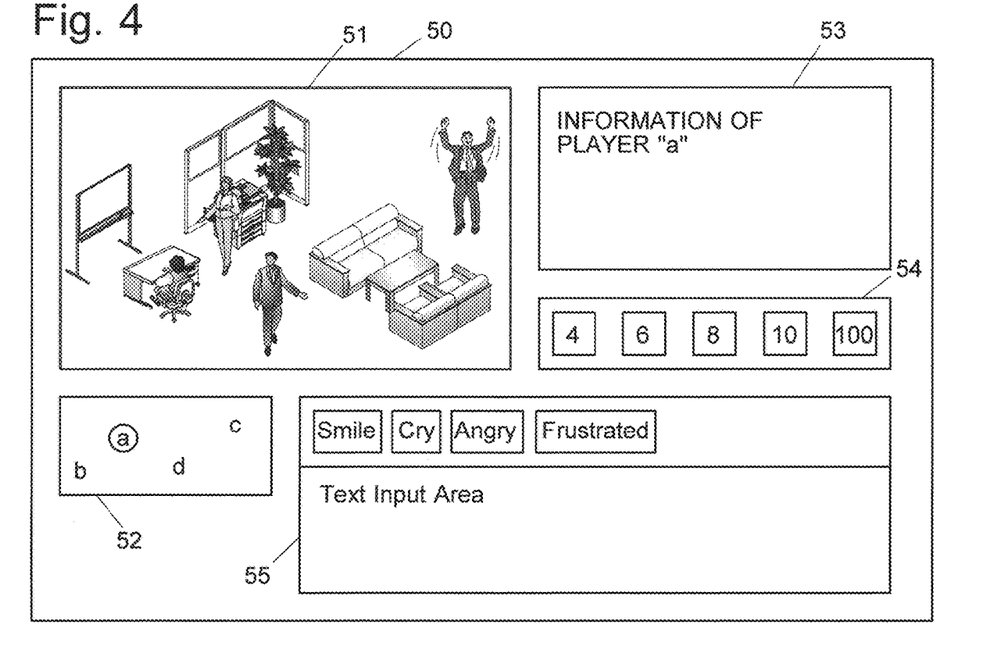
FIG. 4 is an example of the screen to be displayed on the display unit of the player terminal in the present embodiment.

After the character of each player (i.e., the character to be manipulated through the player terminal 30 of each player) has been determined, the game master begins the TRPG. Before the explanation of the flow of the TRPG, the following description shows the configuration of the screen to be displayed on the display unit 26 by the game-master screen display processor 221 in the game-master terminal 20 (FIG. 3), and the screen to be displayed on the display unit 36 by the player screen display processor 321 in each player terminal 30 (FIG. 4). FIGS. 3 and 4 show the case where the TRPG is played by four players using characters "a", b", "c" and "d" (which may also be denoted by PC-a, PC-b, PC-c and PC-d), respectively.

The game-master terminal 20 has a display screen 40, in which a shooting screen display section 41, virtual camera image display section 42, scene overview display section 43, music selector section 44, scene selector section 45, sound effect selector section 46, and character information display section 47 are provided.

Figure 5:
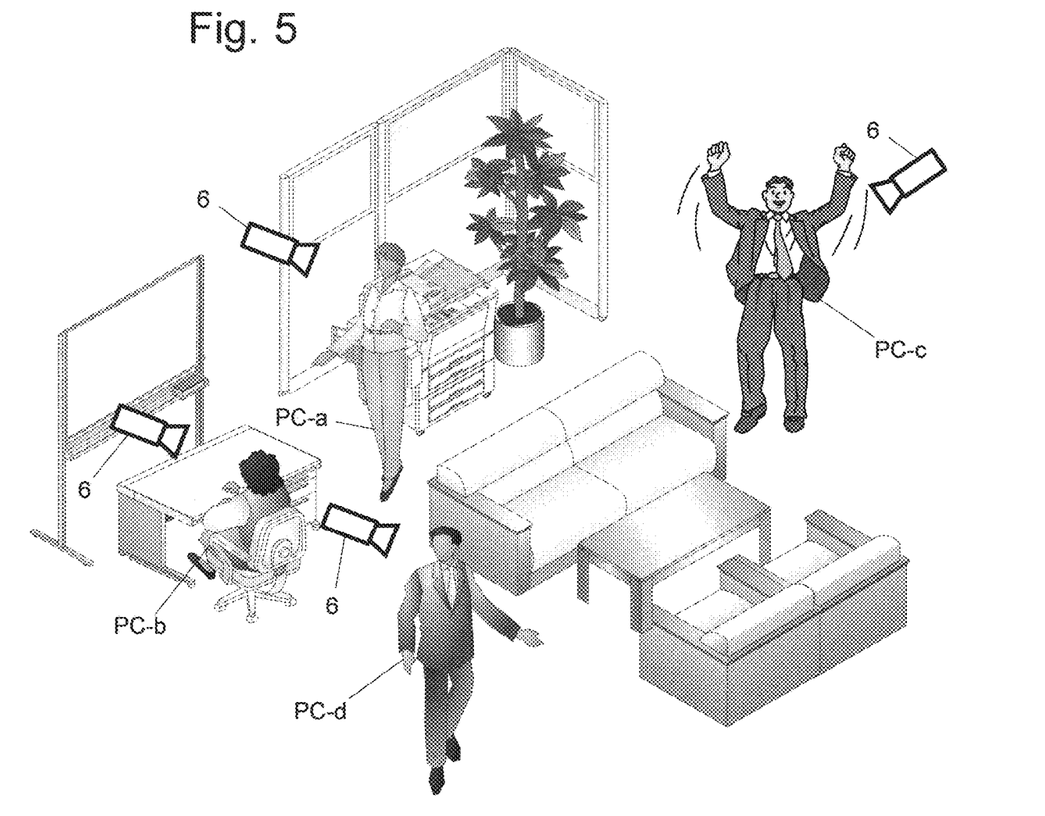
FIG. 5 is an example of a scene and an arrangement of the virtual cameras in the present embodiment.

The shooting screen display section 41 shows the shooting screen of the TRPG. In the present embodiment, this shooting screen doubles as the play screen (i.e., the screen to be presented on the display unit 36 of the player terminal 30). The virtual camera image display section 42 shows individual images taken with a plurality of virtual cameras arranged within the virtual space in which each scene of the TRPG unfolds, as well as image shots. An "image shot" is, for example, an image of an item which plays an important role in a scene of the scenario. Images to be shown as image shots are specified beforehand for each scene. The positions at which the virtual cameras are arranged include a position for obtaining a long-shot view of the entire scene ("long-shot position"), positions from which the player characters (PCs) are individually zoomed in ("PC-shooting positions"), and positions from which non-player characters (NPCs) are individually zoomed in ("NPC-shooting position"). As shown in FIG. 5, each of the PC-shooting and NPC-shooting positions is a position from which the target character (PC or NPC) can be captured by a virtual camera 6 with a predetermined angle of view. The PC-shooting and NPC-shooting positions change with the movements of the characters.

In the present embodiment, the following portions are displayed in the virtual camera image display section 42: a long-shot wide-angle image display portion 421 for showing an image in which the entire scene is captured from the long-shot position with a wide-angle lens; a long-shot normal image display portion 422 for showing an image in which a previously determined target space (e.g., a space including the central position of the current scene or a space where the avatars mainly act in the development of the scenario; in FIG. 3, a space around the sofa) is captured from the long-shot position with a normal lens; PC display portions 423, 424, 425 and 426 for showing zoomed-in images of the PCs (player characters "a", "b", "c" or "d") taken from the corresponding PC-shooting positions, respectively; an NPC display portion 427 for showing a zoomed-in image of an NPC taken from the NPC-shooting position; and image shot display portions 428 and 429 for showing two kinds of image shots. Although one NPC display portion 427 and two image shot display portions 428 and 429 are displayed in the example of FIG. 3, the numbers of these display portions can be appropriately changed.

The scene overview display section 43, music selector section 44, scene selector section 45, sound effect selector section 46 and character information display section 47 are similar to those conventionally used for playing TRPGs. Accordingly, those components will be only briefly described, and no detailed description or drawings will be provided.

The scene overview display section 43 shows a plan view indicating the position of the PCs and NPC (if there is an NPC in the scene) within the virtual space of the ongoing scene. The music selector section 44 shows a list of pieces of background music prepared for the scenario selected by the game master. The scene selector section 45 shows a list of scenes forming the scenario selected by the game master. The sound effect selector section 46 shows a list of sound effects prepared for the scenario selected by the game master. The character information display section 47 shows information concerning the characters "a", "b", "c" and "d" of the players (for example, in the case of a scenario which includes a fighting scene, the information may include the remaining/maximum physical strength, offensive power, defensive power, and possessed items). In the case where the game master is permitted to control the action of any character, the character information display section 47 also shows buttons for indicating the target character and operation buttons for changing specific actions (e.g., facial expression) of the indicated character.

The player terminal 30 has a display screen 50, in which a play screen display section 51, scene overview display section 52, character information display section 53, action judgment display section 54, and action input area 55 are provided. The character information display section 53, action judgment display section 54, and action input area 55 are similar to those conventionally used for playing TRPGs. Accordingly, those components will be only briefly described, and no detailed description or drawings will be provided.

The play screen display section 51 is the main screen for allowing the player to recognize the situation of the ongoing play. As noted earlier, the play screen in the present embodiment is identical to the shooting screen. Therefore, the same screen as in the shooting screen display section 41 in the display screen 40 of the game-master terminal 20 is shown in the play screen display section 51. The scene overview display section 52 shows a plan view indicating the position of the PCs and NPC within the virtual space of the ongoing scene, as in the scene overview display section 43 in the display screen 40 of the game-master terminal 20. The character information display section 53 shows information concerning a character manipulated through the player terminal 30 concerned (for example, in the case of a scenario which includes a fighting scene, the information may include the remaining/maximum physical strength, offensive power, defensive power, and possessed items). The action judgment display section 54 shows the dice to be used in the ongoing scenario for making judgments, such as whether or not an action of the character is a success, or whether or not a specific event occurs, as well as a piece of information concerning the criterion for determining whether or not an action of the character is a success. The action input area 55 shows buttons for selecting the facial expression of the character (e.g., "smile", "cry" or "angry") and a text input box for the character's conversation. Although only the buttons for selecting facial expression are shown in the drawing, buttons for selecting other types of actions, such as "walk" or "run", may also be added as needed. In place of (or along with) those buttons, a motion sensor may be connected to the player terminal 30 so as to capture a body motion of the player and reflect it in the motion of the avatar.

The game-master selects the first scene (Scene 1) from the list of scenes displayed in the scene selector section 45. Then, the scene setter 123 reads the display data of the corresponding scene from the scene display data storage section 111. Each scene is linked with information of the initial shooting image (typically, a long-shot wide-angle image) corresponding to that scene. The shooting position setter 125 sets the shooting position for obtaining a long-shot view of the entire scene ("long-shot position"). The virtual space imager 126 places a virtual camera with a wide-angle lens and one with a normal lens at the long-shot position, and acquires data of an image of the virtual space taken with each camera. The data of the two images obtained at the long-shot position (long-shot wide-angle image and long-shot normal image) are sent to the game-master terminal 20. Additionally, the long-shot wide-angle image is sent to the player terminals 30.

In the game-master terminal 20, the game-master screen display processor 221 displays the long-shot wide-angle image received from the server machine 10 on the shooting screen display section 41 and the long-shot wide-angle image display portion 421, as well as the long-shot normal image on the long-shot normal image display portion 422. In the player terminal 30, the player screen display processor 321 displays the long-shot wide-angle image received from the server machine 10 on the play screen display section 51.

The game master subsequently explains to the players an outline of the scenario to be played (including the background story as well as the goal to be attained in the scenario). This explanation can be made through a microphone provided in the game-master terminal 20 and the speaker provided in each player terminal 30. It may also be sent in the form of a text message from the game-master terminal 20 to the player terminals 30.

Each player determines the position at which the avatar of his/her character should initially be placed within the virtual space by a predetermined operation through the input unit 35 (e.g., a clicking operation within the play screen display section 51). Then, the avatar display controller 124 in the server machine 10 reads the display data of the avatar of the character from the avatar display data storage section 112 and displays the avatar at the indicated position. The player can change the display position of the avatar of his/her character (the standing position of the character in the scene) as needed by a predetermined operation in the play screen display section 51 (e.g., by a drag-and-drop operation).

After the players have determined the standing positions of their respective characters, the shooting position setter 125 determines, for each character, a position for taking a zoomed-in image of the character (PC-shooting position). The shooting position setter 125 also changes the PC-shooting position according to a movement of the character. For each PC-shooting position, the virtual space imager 126 obtains data of an image of the target character taken from the PC-shooting position. The data of the images of the characters are sent to the game-master terminal 20. In the game-master terminal 20, the game-master screen display processor 221 displays the images of the characters "a", "b", "c" and "d" in the PC display portions 423, 424, 425 and 426, respectively.

Thus, at the beginning of the game, the long-shot wide-angle image is displayed in the shooting screen display section 41 of the display unit 26 of the game-master terminal 20 and the play screen display section 51 of the display unit 36 of each player terminal 30. This image includes the avatars of all players located within the virtual space. Simultaneously with the beginning of the game, the play-recording-video creator 128 begins to sequentially acquire data of the image displayed in the shooting screen display section 41 and the play screen display section 51 and save the images in the play-recording-video storage section 114. It also sequentially acquires images taken at predetermined intervals of time with the virtual cameras placed at their respective shooting positions and saves those images in the shooting screen storage section 113 as reference images. The play-recording-video creator 128 may save those data as image files, video files or in other formats. For example, the image data may be prepared in the form of a file in which the location information and pose information of each target (e.g., PC or NPC) within the virtual space at each point in time are related to the information of the virtual camera selected at that point in time (a data file in this format is hereinafter called the "parameter data file"), and this parameter data file may be saved in the play-recording-video storage section 114 at predetermined intervals of time. In summary, the data of the play-recording video may be saved in an appropriate file format which contains necessary information for reproducing image data at each point in time which form the play-recording video.

The game master prompts the players to make their characters act according to the contents of the setting for each scene of the scenario. For example, in a scene in which the characters should search for a target item, the character of each player should indicate the place to be searched and throw the dice to determine whether or not the search is a success. In this case, the game master can allow the player to find a useful item for attaining the goal in the scene according to whether or not the event has been a success.

When prompting an action of a character in the previously described manner, the game master selects the PC image display portion of that character (one of the portions 423-426) from the virtual camera image display section 42 through the input unit 25. Then, the shooting screen switcher 127 displays the selected PC image in the shooting screen display section 41 on the display unit 26 of the game-master terminal 20 and the play screen display section 51 on the display unit 36 of the player terminal 30. Thus, when one of the images in the virtual camera image display section 42 is selected by the game master, the shooting screen switcher 127 changes the display of the shooting screen display section 41 and the play screen display section 51 to the image selected by the game master. By this operation, the game master can draw the viewers' attention to the action of the character which should be focused on.

When the play screen is switched to a zoomed-in image of a specific character in the previously described manner, it is impossible to understand, from the play screen, where the other characters are located within the virtual space. In such a case, each of the players other than the one who is manipulating the zoomed-in character can refer to the scene overview display section 52 and understand where his/her character is located within the virtual space as well as how his/her character is positioned relative to the other players' characters or NPCs. The game master can also understand how the PCs and NPCs are positioned relative to each other.

For example, when a plurality of characters fight with an NPC in one scene, the game master can display an attacking scene of each player or NPC as the play screen by selecting the zoomed-in image of the attacking character or NPC for each attacking turn of the character or NPC. In a scene in which a player is going to throw the dice, a zoomed-in image of the item (dice) can be selected to draw viewers' attention to the spots on the dice. Additionally, when the game master has found a character's avatar making an amusing motion unrelated to the content of the scenario, the game master can select the zoomed-in image of that character.

Figure 6A:
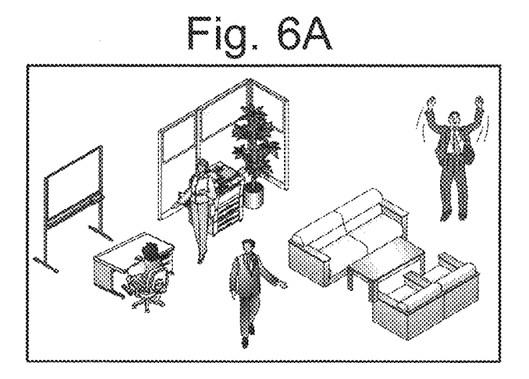
FIGS. 6A-6C are pictures illustrating a play-recording video created in the present embodiment.
Figure 6B:
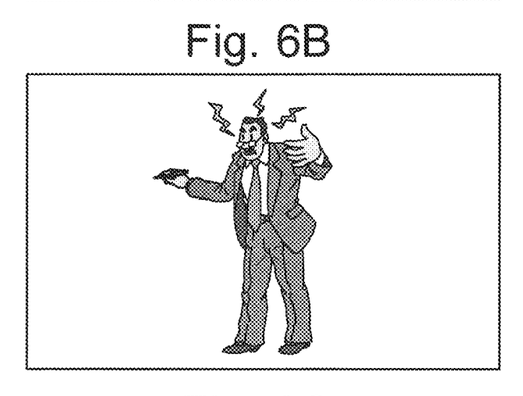
Figure 6C:
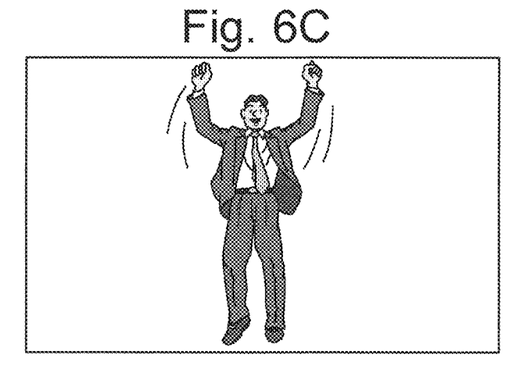

The shooting screen switched by the game master in the previously described manner is sequentially saved in the play-recoding video storage section 113 by the play-recording-video creator 128, and a play-recording video is created from those shooting screens. FIGS. 6A-6C show an example of the sequential switching of the play screen according to the development of the game. At the beginning, a shooting screen showing the entire scene is displayed (FIG. 6A). In a scene in which an NPC appears, the play screen is switched to a shooting screen showing a zoomed-in image of the NPC (FIG. 6B). When a character who has won the fight with the NPC is making a joyful action according to an operation by the player, the play screen is switched to a shooting screen showing a zoomed-in image of that character (FIG. 6C).

Conventional play screens of a TRPG show nothing more than a background image of each scene with avatars of characters superposed on it. Such play screens are monotonous, with few noticeable visual changes except for the facial expression and body motion of the avatars. Therefore, a play video created from those play screens is monotonous and bores the viewers.

By comparison, the system 1 according to the present embodiment enables the game manager to create a varied play screen by switching the displayed image according to the development of the scenario in the previously described manner. Therefore, the viewers can enjoy watching the play-recording video without being bored.

After the previously determined goal has been attained in the first scene, the game master selects the next scene (Scene 2) in the scene selector section 45. For each of the Scenes 2-4, the TRPG is similarly performed by the previously described procedure. When the goal in the last scene (Scene 4), which is also the goal of the scenario, has been attained, the play is completed. As soon as the play is completed, the play-recording-video creator 128 creates a play-recording video based on the shooting screens which have been saved in the shooting screen storage section 113 until that point in time, and saves the video in the play-recording-video storage section 114. Thus, the system 1 according to the present embodiment creates a play-recording video in real time based on the shooting screens appropriately switched by the game master during the play of the TRPG. It is therefore unnecessary to additionally perform time-and-labor-consuming tasks after the play of the TRPG, such as the creation and editing of the video from its origination.

After the play-recording video has been created, the play-recording-video creator 128 notifies the game-master terminal 20 of the completion of the creation of the play-recording video. After receiving the notification, the game master can access the server machine 10 and download the created play-recording video. As described earlier, the data file of the video created by the play-recording-video creator 128 may be prepared in a video-file format or in a parameter-data-file format. Creating the video data in the parameter-data-file format reduces the data volume as compared to the video-file format. The downloaded play-recording video can be made open to other viewers, for example, by being posted to a video site. Additionally, the present embodiment allows the game master to appropriately edit the play-recording video, using the reference images as needed, which are the images taken with the virtual cameras placed at their respective shooting positions and sequentially saved in the shooting screen storage section 113 as reference images, as described earlier. A play-recording video created in the parameter-data-file format allows this editing task to be easily performed by merely modifying the parameters included in the file so as to change the location and/or pose of a target (e.g., PC or NPC) or change the setting of the virtual camera (e.g., to switch to another virtual camera or change the angle of view). According to the present configuration, the play-recording-video creator 128 saves the play-recording video in the play-recording-video storage section 114, from which the game master should download the video. This configuration can be changed; for example, the play-recording-video creator 128 may automatically send the created play-recording video to the game master terminal 20 without saving it in the play-recording-video storage section 114.

The previously described embodiment is a mere example and can be appropriately changed or modified according to the gist of the present invention. Although the system according to the previous embodiment incudes a server machine, game-master terminal and player terminals, the present invention can be embodied as a system including only a game-master terminal and player terminals. In that case, the storage sections and functional blocks similar to those of the server machine 10 in the previous embodiment can be provided in the game-master terminal 20 or player terminals 30.

In the previously described embodiment, the scene in the scenario is represented as a three-dimensional space. It may be a two-dimensional space, as in a conventional TRPG. A play-recording video can also be created in the same manner as in the previous embodiment even the case of an improvised drama that is not a TRPG.

The descriptions in the previous embodiment have been concerned with the case where the game master selects a shooting image at each point in time. A video creation terminal for creating a play-recording video may be provided apart from the game-master terminal. In that case, for example, the system can be configured so that a screen which includes the shooting screen display section 41 (which is used as a play screen display section in the present case), scene overview display section 43, music selector section 44, scene selector section 45, sound effect selector section 46 and character information display section 47 in the display screen described based on FIG. 3 is displayed on the display unit of the game-master terminal, while a screen including the shooting screen display section 41, virtual camera image display section 42 and scene overview display section 43 is displayed on the display unit of the video creation terminal.

The system for creating a play-recording video according to the present invention can also be used for creating a play-recording video of a game in which a player manipulates a character ("manipulation-type game"), such as a sports game (e.g., baseball, tennis or golf) or fighting game. The following description deals with a system for creating a play-recording video to be used for such a type of game, referring to a baseball game as an example. The description will be mainly focused on differences in the display screen from the previous embodiment. Descriptions on the features common to the previous embodiment will be appropriately omitted. The system for creating a play-recording video of a manipulation-type game is a system in which shooting positions and other elements are appropriately added to a conventionally used computer game to create a play-recording video that has never been available before.

The present system for creating a play-recording video also includes a server machine, video creation terminal and one or more player terminals, all of which can be connected to each other through a communication network.

On the display unit of the video creation terminal (which corresponds to the display unit 26 in FIG. 2), a shooting screen in the baseball game is displayed (which corresponds to the shooting screen display section 41 in FIG. 3). Similar to the previous embodiment, virtual cameras are placed at various positions in the baseball stadium, which is a virtual space, including a position for a long-shot view of the entire stadium, positions for obtaining individual views of the avatars of the players' characters (PC-shooting positions), positions for obtaining views of previously determined non-player characters (NPC), such as a field manager, coach, spectators or referees (NPC-shooting positions), as well as positions for capturing various items.

A virtual camera image display section (which corresponds to the virtual camera image display section 42 in FIG. 3) shows individual screens acquired through the virtual cameras, as well as image shots. Similar to the previous embodiment, the image shots in the present example are images of items which play important roles in each scene of the manipulation-type game. For example, they may include an image of an item which temporarily enhances the hitting or pitching ability of the character.

In the present example, the following portions are displayed in the virtual camera image display section on the display unit of the video creation terminal: a long-shot wide-angle image display portion (which corresponds to the long-shot wide-angle image display portion 421 in FIG. 3) for showing an image in which the entire baseball stadium is captured from the long-shot position with a wide-angle lens; a long-shot normal image display portion (which corresponds to the long-shot normal image display portion 422 in FIG. 3) for showing an image in which a previously determined target space (e.g., a space including the pitcher and hitter as viewed from the backscreen) is captured from the long-shot position with a normal lens; PC display portions for showing zoomed-in images of the PCs (e.g., the pitcher or hitter) taken from the corresponding PC-shooting positions, respectively (which correspond to the PC-display portions 423-426 in FIG. 3); an NPC display portion for showing a zoomed-in image of an NPC taken from the NPC-shooting position (which corresponds to the NPC display portion 427 in FIG. 3); and image shot display portions for showing image shots (which correspond to the image shot display portions 428 and 429 in FIG. 3). It should be noted that a play video (which will be described later) may be directly used as an image to be shown in one of the PC display portions.

The display unit of the player terminal (which corresponds to the display unit 36 in FIG. 2) includes a play screen display section (which corresponds to the shooting screen display section 51 in FIG. 4). As in a conventional computer game of this type, the play screen display section shows a necessary screen for a player (e.g., a screen for a pitching motion which shows a view of the catcher from the pitcher, or a screen for a hitting motion which shows a view of the pitcher from the catcher) to perform manipulations of a character (for the pitching, hitting or other motions). The scene overview display section, character information display section, action judgment display section, and action input area in the previous embodiment may optionally be provided according to the characteristics of the manipulation-type game concerned. The play screen is an image in which one of the avatars of the characters arranged within the virtual space is captured with a previously determined angle of view. Therefore, as noted earlier, this play screen may also be used as an image to be displayed in one of the PC display portions. This decreases the number of virtual cameras to be added for taking images for the shooting screen, whereby the system load can be lowered.

In the case of a manipulation-type game, the shooting screen is not always the same as the play screen (for example, when the shooting image is a long-shot view of the entire baseball stadium, the shooting screen cannot double as the play screen since the players cannot manipulate their characters on that screen). In the present system, the manipulation-type game itself is played in the same manner as in a conventional system, independently of the tasks for the video creation by the video creator. Accordingly, the following description will be exclusively focused on the flow of the video creation.

The video creator watches the progress of the manipulation-type game (baseball match) and determines the shooting target at each point in time. For example, when the game is in a clutch situation, the pitcher and hitter can be considered as the shooting target, so that the video creator selects, as the shooting image, an image taken from a shooting position from which their avatars are captured. In other situations, for example, an image taken from a shooting position from which the supporters or the field manager is captured can be selected. When the hitter has hit a big fly, an image obtained with a virtual camera which follows the ball can be selected as the shooting image. Thus, the video creator appropriately determines which shooting image should be selected. The selected shooting image is displayed in the shooting screen display section (which corresponds to the shooting screen display section 41 in FIG. 3) on the display unit of the video creation terminal.

Similar to the previous example, simultaneously with the beginning of the game, the play-recording-video creator (which corresponds to the play-recording-video creator 128 in FIG. 2) begins to sequentially acquire data of the image displayed in the shooting screen display section and save the images in the play-recording-video storage section (which corresponds to the play-recording-video storage section 114 in FIG. 2). It also sequentially acquires images taken at predetermined intervals of time with the virtual cameras placed at their respective shooting positions and saves those images in the shooting screen storage section (which corresponds to the shooting screen storage section 113 in FIG. 2) as reference images.

After the manipulation-type game has been completed (e.g., after the match is over), the play-recording-video creator creates a play-recording video based on the shooting screens which have been saved in the shooting screen storage section until that point in time, and saves the video in the play-recording-video storage section. After the play-recording video has been created, the play-recording-video creator notifies the video creation terminal of the completion of the creation of the play-recording video. After receiving the notification, the video creator can access the server machine and download the created play-recording video. The downloaded play-recording video can be made open to other viewers, for example, by being posted to a video site.

Similar to the previous embodiment, the present example also allows the video creator to appropriately edit the play-recording video created by the play-recoding-video creator, using the reference images which are the images taken with the virtual cameras placed at their respective shooting positions and sequentially saved in the shooting screen storage section as reference images, as described earlier.

A play-recording video composed of real-time images corresponding to one game has a considerable length that corresponds to the actual length of one game (e.g., three hours). To address this problem, the system may additionally be configured, for example, to allow the video creator to flag any desired scene to indicate that the scene is important in selecting the shooting image. From this play-recording video, the shooting images at the flagged points in time can be selectively extracted and edited into a short video similar to the digest in sports news.

A conventional play video of a manipulation-type game is a simple record of a play screen which is displayed on a player terminal and is originally designed for the manipulation of a character by a player. Therefore, the resulting video is monotonous, with few noticeable visual changes except for the body motion of the character. By comparison, the system according to the present example creates a video composed of images taken from the most attractive viewpoints according to the progress of the game, as in a live broadcast of a sporting event. Therefore, viewers can enjoy watching the play-recording video without being bored even when the video is considerably long.

REFERENCE SIGNS LIST

10 . . . Server Machine
11 . . . Storage Unit
111 . . . Scene Display Data Storage Section
112 . . . Avatar Display Data Storage Section
113 . . . Play Screen Storage Section
12 . . . Server Machine Program
121 . . . Terminal Determiner
122 . . . Scenario Determiner
123 . . . Scene Setter
124 . . . Avatar Display Controller
125 . . . Shooting Position Setter
126 . . . Virtual Space Imager
127 . . . Shooting Screen Switcher
128 . . . Play-Recording-Video Creator
20 . . . Game-Master Terminal
21 . . . Storage Section
22 . . . Game-Master Terminal Program
221 . . . Game-Master Screen Display Processor
25 . . . Input Unit
26 . . . Display Unit
30 . . . Player Terminal
31 . . . Storage Section
32 . . . Player Terminal Program
321 . . . Player Screen Display Processor
35 . . . Input Unit
36 . . . Display Unit
40 . . . Display Screen
41 . . . Shooting Screen Display Section
42 . . . Virtual Camera Image Display Section
421 . . . Long-Shot Wide-Angle Image Display Portion
422 .. . Long-Shot Normal Image Display Portion
423-426 . . . PC Display Portion
427 . . . NPC Display Portion
428, 429 . . . Image Shot Display Portion
43 . . . Scene Overview Display Section
44 . . . Music Selector Section
45 . . . Scene Selector Section
46 . . . Sound Effect Selector Section
47 . . . Character Information Display Section 50 . . . Display Screen
51 . . . Play Screen Display Section
52 . . . Scene Overview Display Section
53 . . . Character Information Display Section
54 . . . Action Judgment Display Section
55 . . . Action Input Area
6 . . . Virtual Camera

The invention claimed is:

1. A system for creating a play-recording video which records a play performed by one or more players using their respective characters, the system comprising:
a first terminal including a first display section;
one or more second terminals each of which includes a second display section and is connectable to the first terminal via a communication network;
a storage section in which display data of a virtual space in which the play is performed, and display data of avatars of the characters, are stored;
an avatar display controller configured to respond to a predetermined input operation on one of the second terminals and read, from the storage section, the display data of the avatar of the character of the player corresponding to the terminal concerned, as well as display the avatar in the virtual space;
a shooting position setter configured to respond to a predetermined input operation on the first terminal and set, as a shooting position, a long-shot position for obtaining a long-shot view of the entire virtual space or an avatar-capturing position for capturing, with a previously determined angle of view, one of the avatars of the one or more characters arranged within the virtual space;
a virtual space imager configured to create an image of the virtual space taken with a virtual camera at the shooting position;
a first screen display controller configured to display an image obtained by the virtual space imager, as a shooting screen on the first display section;
a second screen display controller configured to display, on the second display section, the shooting screen or a previously determined play screen for manipulating the characters; and
a play-recording-video creator configured to create a play-recording video by sequentially recording the shooting screen.

2. The system for creating a play-recording video according to claim 1, wherein the first display section includes:
a shooting screen display area for displaying the shooting screen;
a long-shot-image display area for displaying a long-shot image showing the entire virtual space; and
an avatar-image display area for displaying an image in which the avatars of the one or more characters are individually captured.

3. The system for creating a play-recording video according to claim 1, wherein the second display section includes:
a first display area for displaying the shooting screen or the play screen; and
a character position information area for displaying an image showing a position within the virtual space of the avatar of the character of the player operating the second terminal concerned.

4. The system for creating a play-recording video according to claim 1, wherein the shooting position setter sets the long-shot position, the avatar capturing position, or an all-avatar capturing position for capturing the avatars of all characters, as the shooting position.

5. The system for creating a play-recording video according to claim 1, further comprising:
a server machine capable of connecting to the first terminal and the second terminal via a communication network,
wherein the server machine includes at least one of following components: the storage section, the avatar display controller, the shooting position setter, the virtual space imager, the first screen display controller, the second screen display controller, and the play-recording-video creator.

6. The system for creating a play-recording video according to claim 1, wherein the system is configured to create a play-recording video of a table-top role-playing game.

7. The system for creating a play-recording video according to claim 6, wherein the first screen display controller and/or the second screen display controller are further configured to display, on the first display section and the second display section, an image of an item to be used in the table-top role-playing game.

8. The system for creating a play-recording video according to claim 1, wherein the virtual space is a three-dimensional space.

* * * * *